(12) United States Patent
Venkatasubramanian (10) Patent No.: US 12,069,055 B2
(45) Date of Patent: Aug. 20, 2024

(54) MECHANISM FOR MANAGING SERVICES TO NETWORK ENDPOINT DEVICES

(71) Applicant: Intel Corporation, Santa Clara, CA (US)

(72) Inventor: Sankaranarayanan Venkatasubramanian, Tirunelveli (IN)

(73) Assignee: Intel Corporation, Santa Clara, CA (US)

( * ) Notice: Subject to any disclaimer, the term of this patent is extended or adjusted under 35 U.S.C. 154(b) by 218 days.

(21) Appl. No.: 17/545,254

(22) Filed: Dec. 8, 2021

(65) Prior Publication Data

US 2022/0103557 A1    Mar. 31, 2022

(51) Int. Cl.
*H04L 29/00*    (2006.01)
*H04L 9/40*    (2022.01)
*H04L 67/51*    (2022.01)

(52) U.S. Cl.
CPC .......... *H04L 63/10* (2013.01); *H04L 63/0876* (2013.01); *H04L 63/102* (2013.01); *H04L 63/1433* (2013.01); *H04L 67/51* (2022.05)

(58) Field of Classification Search
CPC ... H04L 63/10; H04L 63/0876; H04L 63/102; H04L 63/1433; H04L 67/51; H04L 9/3234; H04L 67/56; G06F 21/57
See application file for complete search history.

(56) References Cited

U.S. PATENT DOCUMENTS

| | | | |
|---|---|---|---|
| 7,079,020 B2* | 7/2006 | Stilp | G08B 25/002 340/572.1 |
| 9,697,371 B1* | 7/2017 | Willden | H04L 63/08 |
| 9,804,866 B2* | 10/2017 | Halls | G06F 21/79 |
| 2012/0115542 A1* | 5/2012 | Griffin | H04W 40/02 455/552.1 |
| 2017/0180386 A1* | 6/2017 | Dewan | G09C 1/00 |
| 2018/0254898 A1* | 9/2018 | Sprague | H04L 9/0637 |
| 2019/0042805 A1* | 2/2019 | Desai | G06F 21/57 |
| 2019/0140836 A1* | 5/2019 | Novak | G06F 21/53 |
| 2019/0140846 A1* | 5/2019 | Moore | H04L 9/0825 |
| 2020/0014546 A1* | 1/2020 | Karame | G06F 21/57 |
| 2021/0044976 A1* | 2/2021 | Avetisov | H04L 63/0815 |
| 2021/0258308 A1* | 8/2021 | Avetisov | H04L 9/088 |
| 2021/0397700 A1* | 12/2021 | Stapf | G06F 12/1483 |
| 2022/0029823 A1* | 1/2022 | Law | G06Q 20/3227 |
| 2022/0078209 A1* | 3/2022 | V | H04L 63/105 |
| 2022/0179963 A1* | 6/2022 | Chen | G06F 21/572 |
| 2023/0107763 A1* | 4/2023 | Ott | H04L 9/0618 713/189 |

* cited by examiner

*Primary Examiner* — Don G Zhao
(74) *Attorney, Agent, or Firm* — Jaffery Watson; Mendonsa & Hamilton LLP (57) ABSTRACT

An apparatus comprising a processor comprising a trusted execution environment (TEE) to be attested by a plurality of service provider servers on behalf of a plurality of endpoint devices in a network environment and provision kernels for the plurality of service provider servers requesting to access one or more of the plurality of endpoint devices.

19 Claims, 8 Drawing Sheets

MECHANISM FOR MANAGING SERVICES TO NETWORK ENDPOINT DEVICES

BACKGROUND OF THE DESCRIPTION

In a typical home network or enterprise network there can be more than one device that consumes services (media, transactions, closed circuit television (CCTV) monitoring, image processing, entertainment, etc.) from external service providers that use trusted execution environments (TEEs) in the respective devices. The service providers typically perform attestation against each of these individual devices before they begin providing the services.

BRIEF DESCRIPTION OF THE DRAWINGS

So that the manner in which the above recited features can be understood in detail, a more particular description, briefly summarized above, may be had by reference to embodiments, some of which are illustrated in the appended drawings. It is to be noted, however, that the appended drawings illustrate only typical embodiments and are therefore not to be considered limiting of its scope, for the disclosure may admit to other equally effective embodiments.

DETAILED DESCRIPTION

In the following description, numerous specific details are set forth to provide a more thorough understanding. However, it will be apparent to one of skill in the art that the embodiments may be practiced without one or more of these specific details. In other instances, well-known features have not been described in order to avoid obscuring the embodiments.

In embodiments, a mechanism is provided to implement a master TEE within a home or enterprise network environment to operate as an intermediary between service providers and endpoint devices within the environment. In such an embodiment, the service providers install and provision kernels at the master TEE. Once the master TEE is attested, the service providers may initiate communication and services with endpoint devices within that environment.

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified, the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

Figure 1:
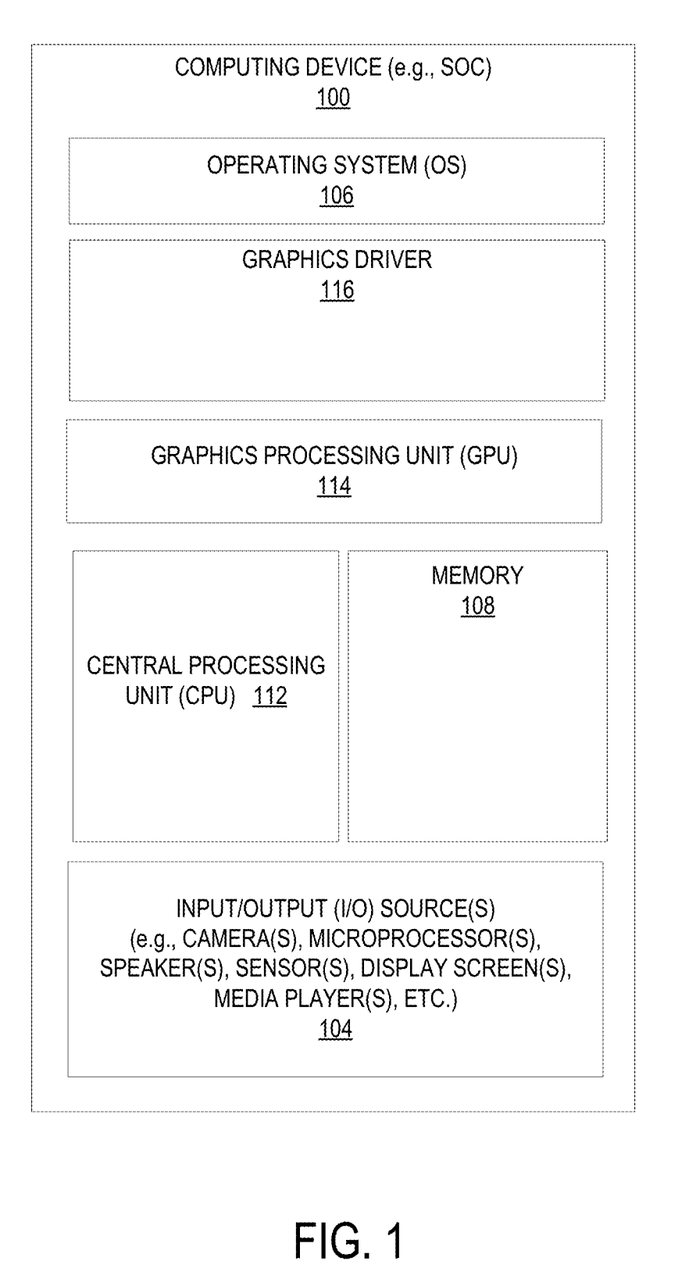
FIG. 1 illustrates one embodiment of a computing device.

FIG. 1 illustrates one embodiment of a computing device 100. According to one embodiment, computing device 100 comprises a computer platform hosting an integrated circuit ("IC"), such as a system on a chip ("SoC" or "SOC"), integrating various hardware and/or software components of computing device 100 on a single chip. As illustrated, in one embodiment, computing device 100 may include any number and type of hardware and/or software components, such as (without limitation) graphics processing unit 114 ("GPU" or simply "graphics processor"), graphics driver 116 (also referred to as "GPU driver", "graphics driver logic", "driver logic", user-mode driver (UMD), UMD, user-mode driver framework (UMDF), UMDF, or simply "driver"), central processing unit 112 ("CPU" or simply "application processor"), memory 108, network devices, drivers, or the like, as well as input/output (I/O) sources 104, such as touchscreens, touch panels, touch pads, virtual or regular keyboards, virtual or regular mice, ports, connectors, etc. Computing device 100 may include operating system (OS) 106 serving as an interface between hardware and/or physical resources of computing device 100 and a user.

It is to be appreciated that a lesser or more equipped system than the example described above may be preferred for certain implementations. Therefore, the configuration of computing device 100 may vary from implementation to implementation depending upon numerous factors, such as price constraints, performance requirements, technological improvements, or other circumstances.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The terms "logic", "module", "component", "engine", and "mechanism" may include, by way of example, software or hardware and/or a combination thereof, such as firmware.

Embodiments may be implemented using one or more memory chips, controllers, CPUs (Central Processing Unit), microchips or integrated circuits interconnected using a motherboard, an application specific integrated circuit (ASIC), and/or a field programmable gate array (FPGA). The term "logic" may include, by way of example, software or hardware and/or combinations of software and hardware.

Figure 2:
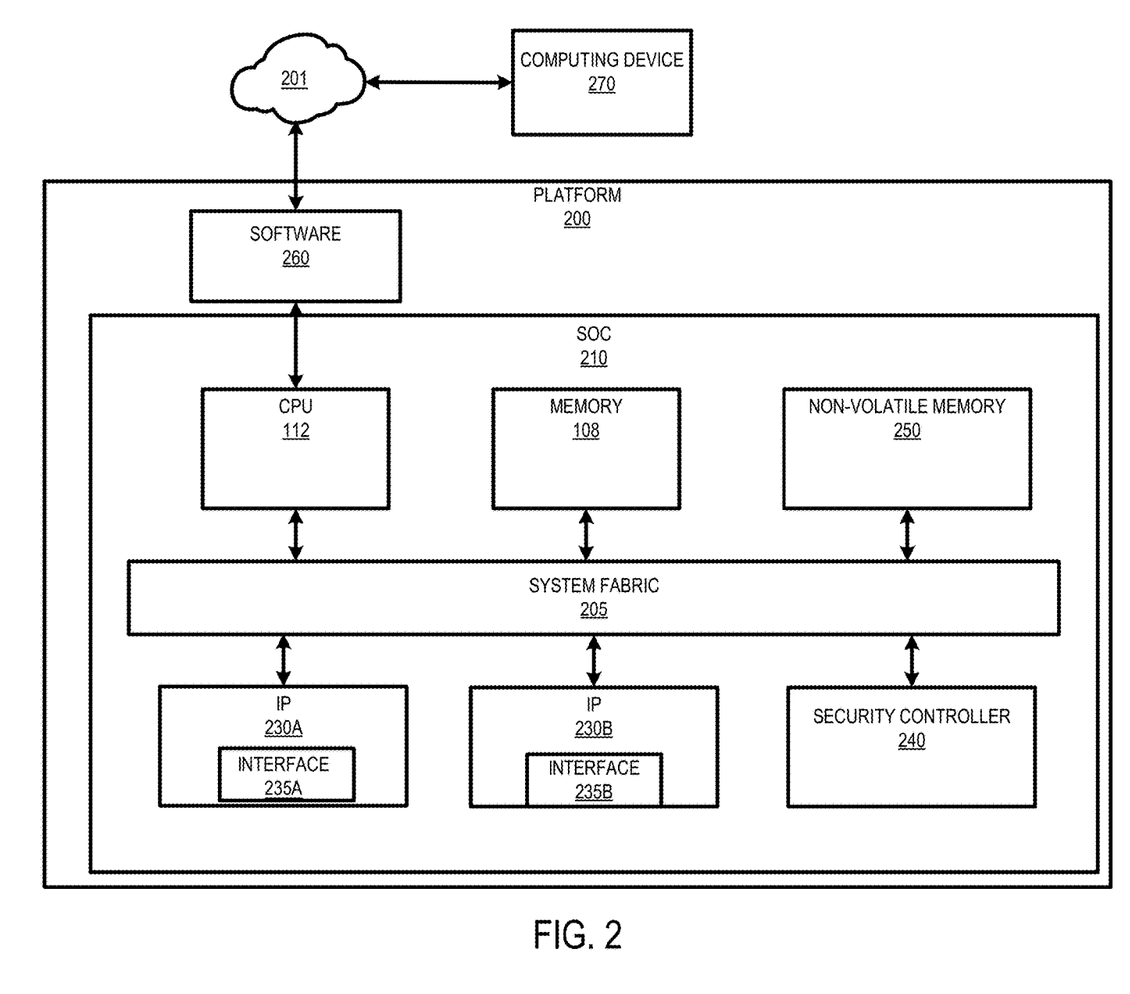
FIG. 2 illustrates one embodiment of a platform.

FIG. 2 illustrates one embodiment of a platform 200 including a SOC 210 similar to computing device 100 discussed above. As shown in FIG. 2, platform 200 includes SOC 210 communicatively coupled to one or more software components 260 via CPU 112. In a further embodiment, platform 200 may also be coupled to a computing device 270 via a cloud network 201. In this embodiment, computing device 270 comprises a cloud agent that is provided access to SOC 210 via software 260.

Additionally, SOC 210 includes other computing device components (e.g., memory 108) coupled via a system fabric 205. In one embodiment, system fabric 205 comprises an integrated on-chip system fabric (IOSF) to provide a standardized on-die interconnect protocol for coupling interconnect protocol (IP) agents 230 (e.g., IP blocks 230A and 230B) within SOC 210. In such an embodiment, the interconnect protocol provides a standardized interface to enable third parties to design logic such as IP agents to be incorporated in SOC 210.

According to embodiment, IP agents 230 may include general purpose processors (e.g., in-order or out-of-order cores), fixed function units, graphics processors, I/O controllers, display controllers, etc. In such an embodiment, each IP agent 230 includes a hardware interface 235 (e.g., 235A and 235B) to provide standardization to enable the IP agent 230 to communicate with SOC 210 components. For example, in an embodiment in which IPA agent 230 is a third party visual processing unit (VPU), interface 235 provides a standardization to enable the VPU to access memory 108 via fabric 205.

SOC 210 also includes a security controller 240 that operates as a security engine to perform various security operations (e.g., security processing, cryptographic functions, etc.) for SOC 210. In one embodiment, security controller 240 comprises a cryptographic processor IP agent 230 implemented to perform the security operations. Further, SOC 210 includes a non-volatile memory 250. Non-volatile memory 250 may be implemented as a Peripheral Component Interconnect Express (PCIe) storage drive, such as a solid-state drive (SSD) or Non-Volatile Memory Express (NVMe) drives.

According to one embodiment, platform 200 may be implemented as a trusted execution environment (TEE). A TEE is a secure area of platform 200 (e.g., CPU 112) that guarantees code and data loaded within platform 200 are protected with respect to confidentiality and integrity. Additionally, TEE is an isolated execution environment that provides security features such as isolated execution and integrity of applications executing with the TEE, along with confidentiality of their assets. Thus, the TEE offers an execution space that provides a higher level of security for trusted applications operating on platform 200.

Figure 3:
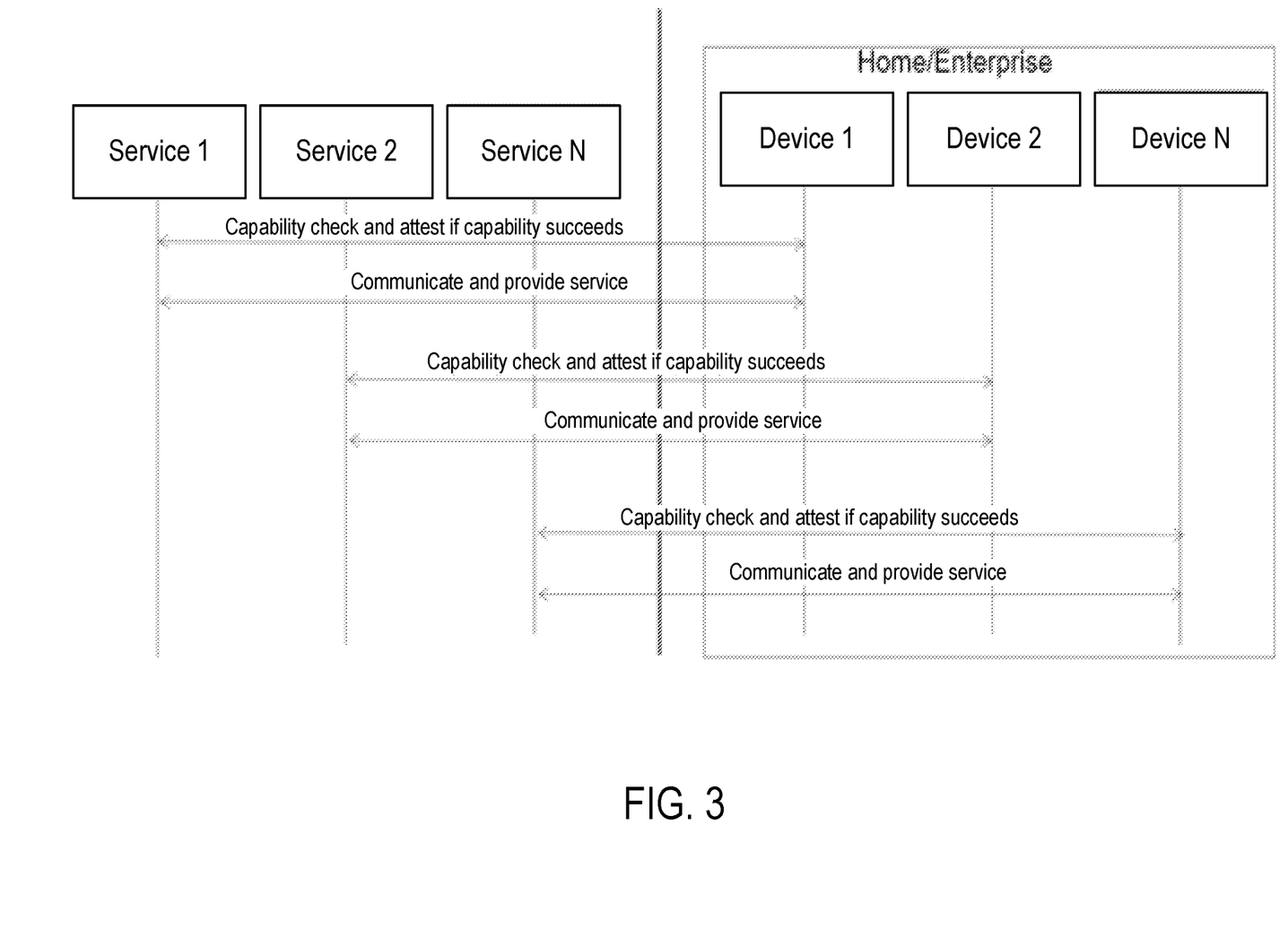
FIG. 3 illustrates conventional services provided to network devices.

As discussed above, a typical home or enterprise network environment may include various platforms 200 (e.g., smart televisions, phones, media streaming devices, etc.), each accessing services provided by a plurality of service providers (e.g., Netflix®, Prime Video®, etc.). FIG. 3 illustrates conventional services provided to network devices. As shown in FIG. 3, each service has to attest the individual devices prior to providing the services. Since the individual devices include various types of TEEs, the complexity and overhead that the service providers encounter is significant. For example, the service providers have to maintain a number of different backend services for every such TEE/device to attest and provide services. As used herein, attestation is a dynamic measuring of the health of an isolated execution technology, and is based on building a trust chain. This process assures that only known code is running in the device, and verifies the full supply chain integrity of the processing engine producing secure information.

According to one embodiment, a master device is included in a network to facilitate access to endpoint devices by all service providers. In such an embodiment, the master device includes a master TEE that is configured to execute generic, custom and security-related instruction code (or kernels) that enables each service provider to only have to interface with the master TEE to perform attestation and provision the kernels. As a result, the service providers do not need to individually attest the endpoint devices. In a further embodiment, the master TEE executes the kernels and redirects the requests from the service providers to the endpoint devices in a secure manner. Since the master TEE is capable of executing security-related kernels, strict isolation is achieved with regards to interfacing multiple endpoint TEEs and the services each is accessing from respective service providers. As used in herein, a kernel is defined as executable code capable of performing various computations, service/cryptographic/key/policy management, etc.

Figure 4:
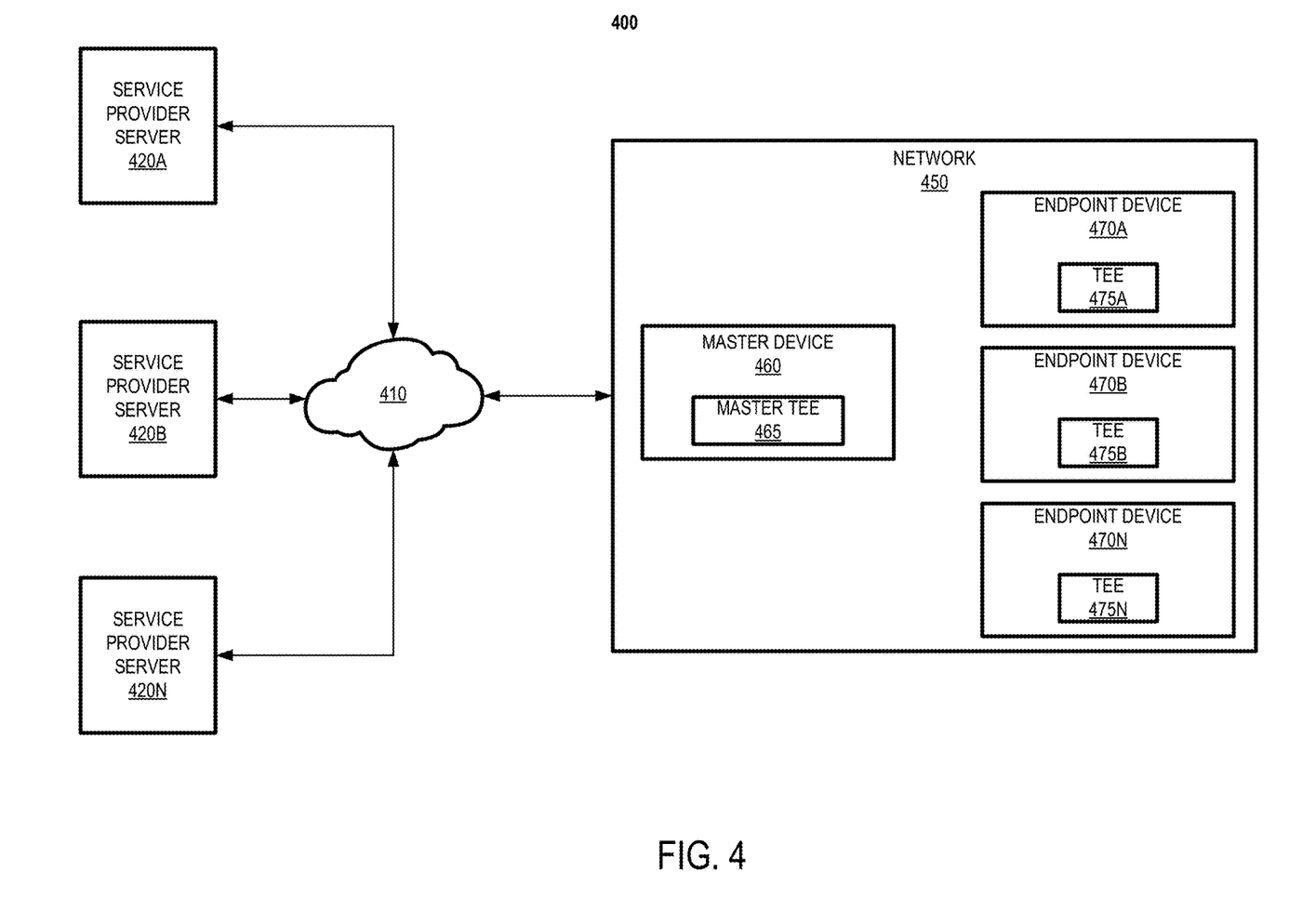
FIG. 4 illustrates one embodiment of a system.

FIG. 4 illustrates one embodiment of a system 400 including a plurality of service provider servers 420 (e.g., 420A-420N) coupled to a network 450 (e.g., home or enterprise) via a network 410. Network 450 includes a master device 460 and a plurality of endpoint devices 470 (e.g., 470A-470N). In one embodiment, master device 460 includes a master TEE 465, while each endpoint device 470 includes a TEE 475 (e.g., 475A-475N). In a further embodiment, master device 460 and endpoint devices 470 each comprise a platform 200 discussed above in FIG. 2.

Figure 5:
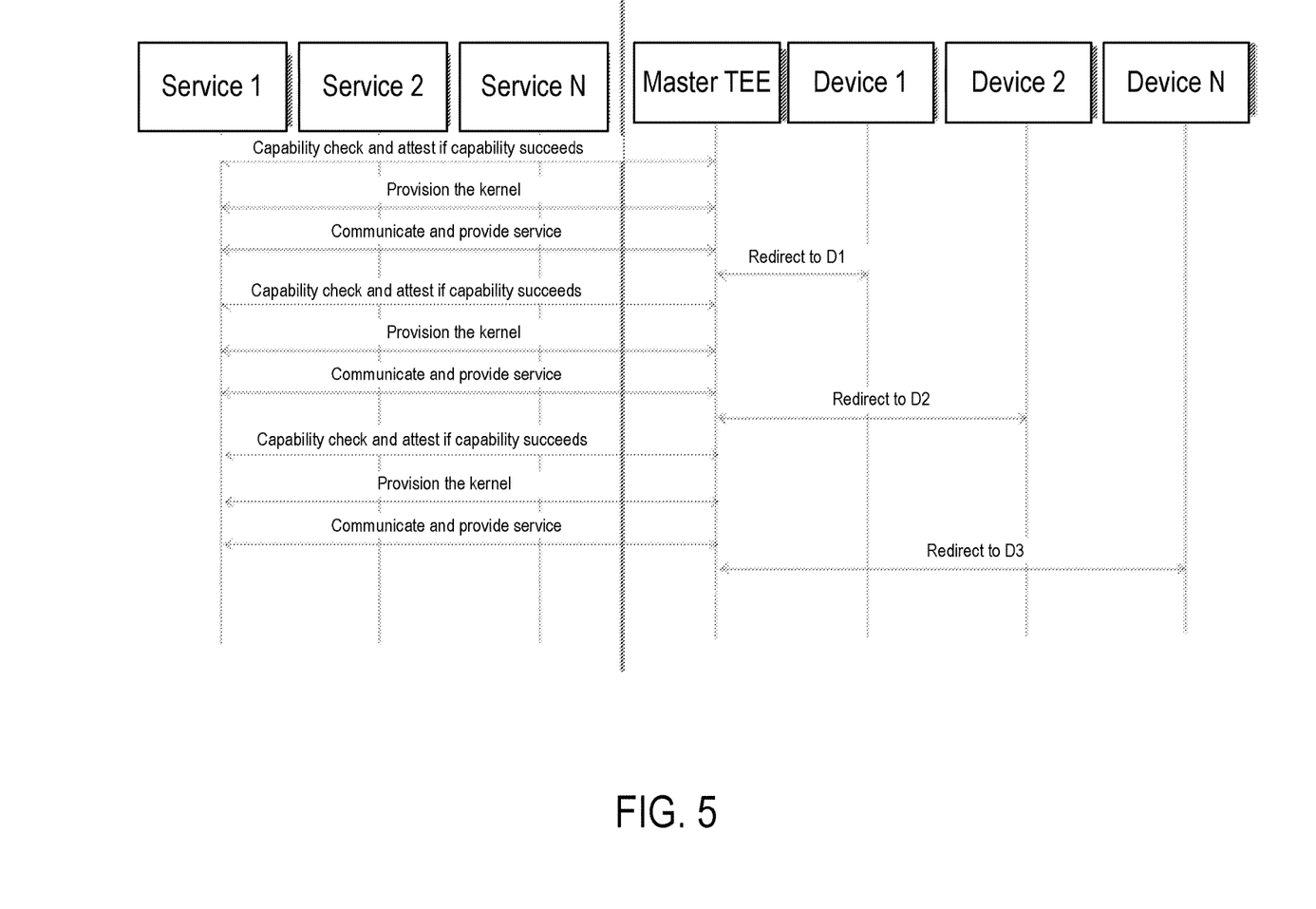
FIG. 5 is a sequence diagram illustrating one embodiment of providing services to network devices.

As mentioned above, master TEE 465 is attested by service provider servers 420 on behalf of endpoint devices 470. Additionally, each service provider server 420 requesting to access an endpoint device 470 provisions kernels to master TEE 465. In this embodiment, service provider servers 420 transmit the kernels to be executed at master TEE 465 after attestation. Subsequently master TEE 465 redirects the requests from the service provider server 420 to the endpoint devices 470. FIG. 5 is a sequence diagram illustrating one embodiment of providing services to network devices via the master TEE. As shown in FIG. 5, service 1 performs a capability check with the master TEE and attests the master TEE if capability succeeds. Subsequently, the service 1 kernel is provisioned at the master TEE prior to redirecting the service to device 1. FIG. 5 shows that the same process is performed for Service 1 to access Device 2-Device N.

According to one embodiment, master TEE 465 performs service discovery and registration with endpoint devices 470. In such an embodiment, master TEE 465 initializes itself and advertises its capabilities for aggregating devices 470. In a further embodiment, applications at the devices 470 associated with the service provider servers 420 detect if aggregation service is available at the device 470 (e.g., via application settings). Subsequently, the TEEs 475 at devices 470 register themselves with master TEE 465 upon a determination that the service is advertised and visible to the endpoint devices 470 and the capabilities match. Master TEE 465 then acknowledges the registration and securely records information associated with each endpoint device as part of the registration.

According to one embodiment, the communication between master TEE 465 and the endpoint TEEs 475 are secured at the time of registration. In a further embodiment, a small application (or applet) is installed by the endpoint TEE 475 as a part of the registration to facilitate communication with the service provider servers 420 once redirected by master TEE 465. In yet a further embodiment, the registration process may be skipped in instances in which master TEE 465 and an endpoint TEEs 475 have the same capabilities.

Figure 6:
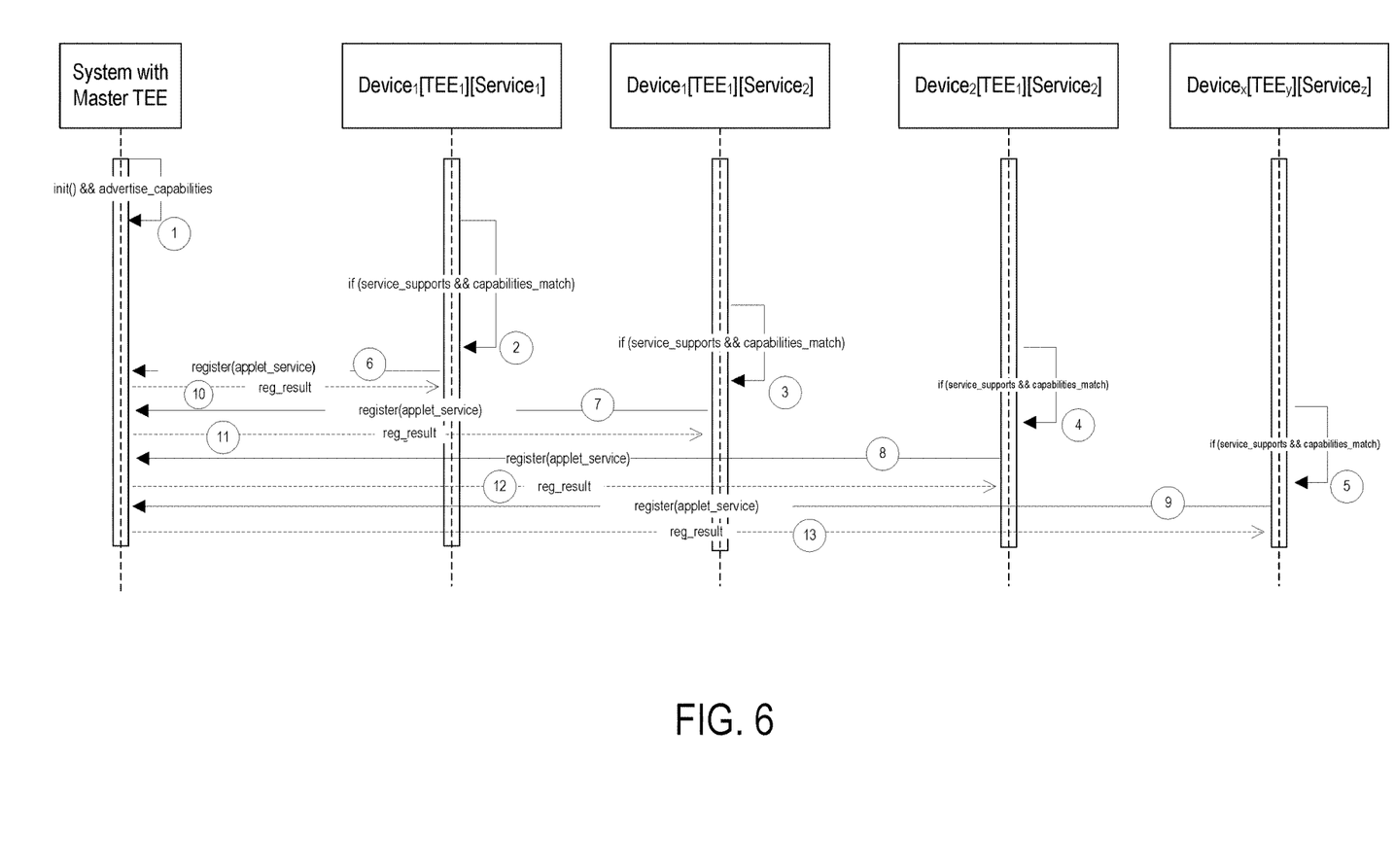
FIG. 6 is a sequence diagram illustrating one embodiment of TEE service discovery and registration.

FIG. 6 is a sequence diagram illustrating one embodiment of TEE service discovery and registration. At time 1, the Master TEE initializes itself and advertises its capabilities. At times 2-5, the devices detect whether the aggregation service is available at the respective devices. At times 6-9, the devices register themselves with the Master TEE. At times 10-13, the Master TEE acknowledges the registration with the respective devices.

According to one embodiment, service provider servers 420 still need to perform an attestation of the endpoint devices 470 after the endpoint devices 470 have requested a service. As part of this attestation, the endpoint TEE 475 shares the master TEE 465 capabilities and details. The service provider server 420 establishes and initiates a secure communication with master TEE 465 upon a determination that the master TEE 465 details are acceptable. The service provider server 420 will then attest master TEE 465 once communication is well established. The service provider server 420 will securely provision the kernel as well as the keys that an endpoint devices 470 will require for functionality once attestation succeeds. When this provisioning has been completed, the service provider server 420 is ready to provide a service the endpoint TEE 465 via master TEE 465. As a result, there is no need for attestation of individual devices for future access.

Figure 7:
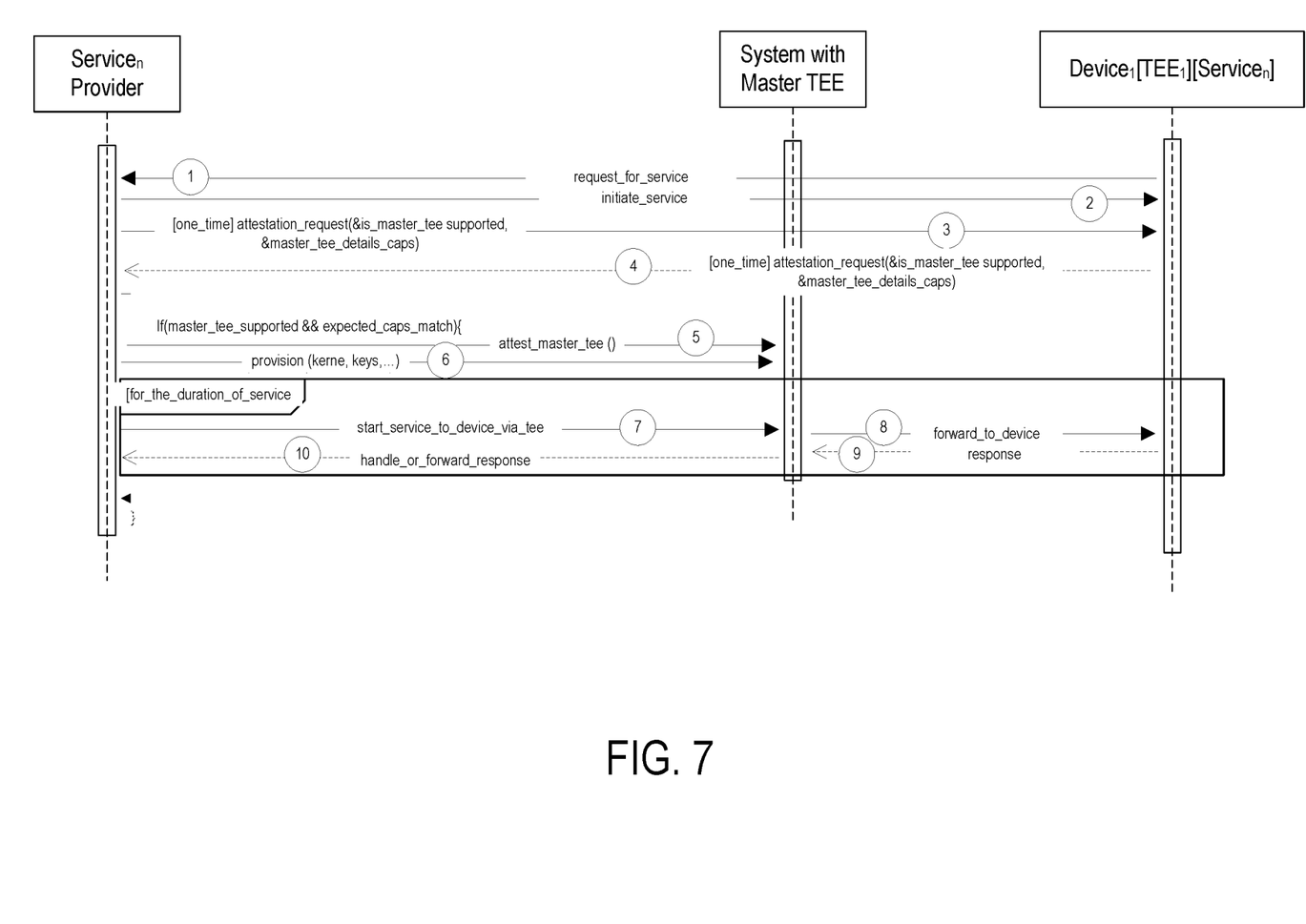
FIG. 7 is a sequence diagram illustrating one embodiment of servicing the endpoint TEE(s) via a master TEE.
Figure 8:
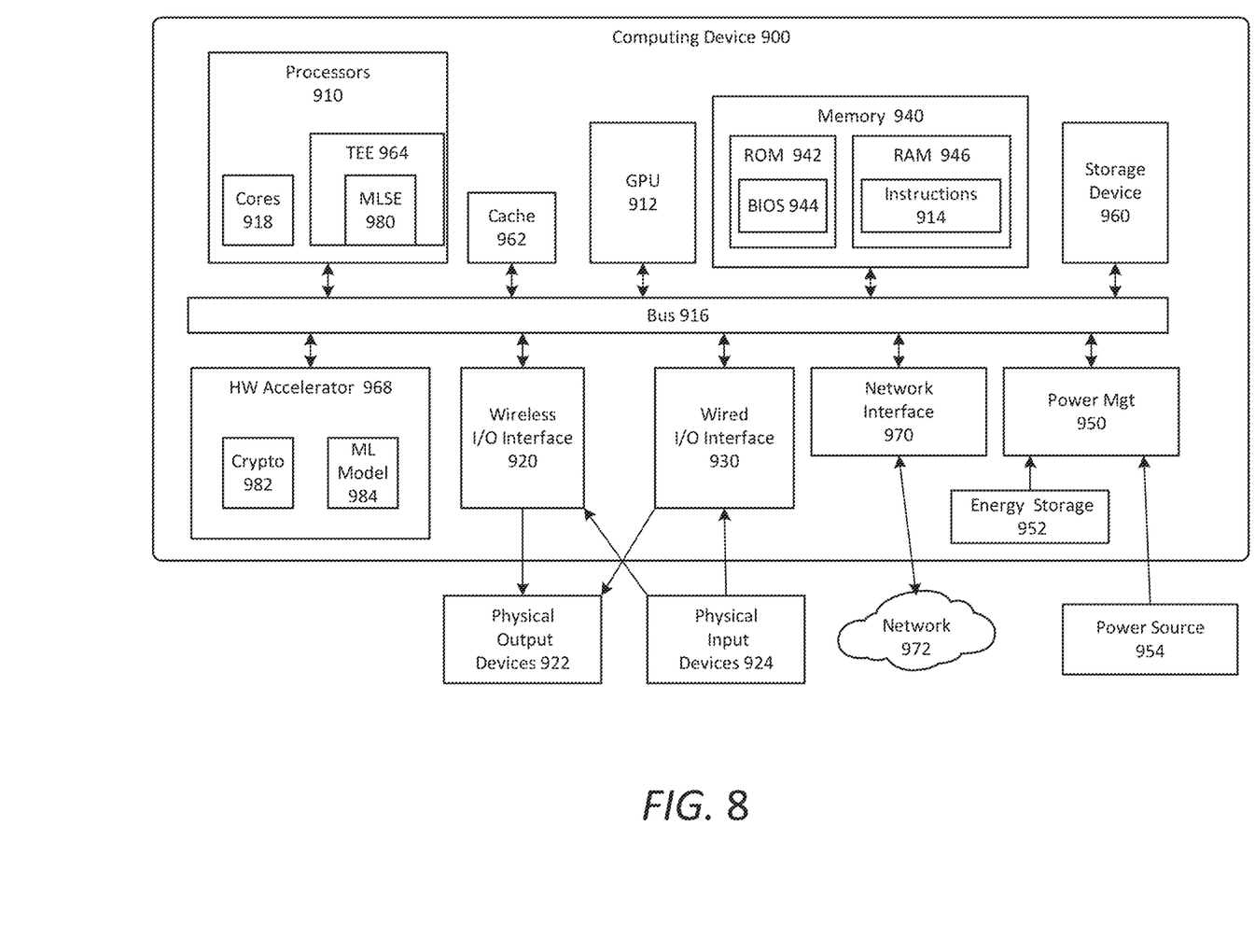
FIG. 8 is a schematic diagram of an illustrative electronic computing device.

FIG. 7 is a sequence diagram illustrating one embodiment of servicing the endpoint TEE(s) via a master TEE. At time 1, the device requests service from the service provider. At time 2, the service provider initiates service. At time 3, a one-time attestation request is made from the device to the service provider. At time 4, the service provider attests the device. At time 5, the service provider attests the master TEE. At time 6, the service provider provisions the master TEE. At time 7, the service provider begins service via the master TEE. At time 8, the master TEE forwards the service to the device. At time 9, the device transmits a response to the master TEE. At time 10, the master TEE forwards the response to the service provider FIG. 8 is a schematic diagram of an illustrative electronic computing device. In some embodiments, the computing device 900 includes one or more processors 910 including one or more processors cores 918 and a TEE 964, the TEE including a machine learning service enclave (MLSE) 980. In some embodiments, the computing device 900 includes a hardware accelerator 968, the hardware accelerator including a cryptographic engine 982 and a machine learning model 984. In some embodiments, the computing device is to provide enhanced protections against ML adversarial attacks, as provided in FIGS. 1-7.

The computing device 900 may additionally include one or more of the following: cache 962, a graphical processing unit (GPU) 912 (which may be the hardware accelerator in some implementations), a wireless input/output (I/O) interface 920, a wired I/O interface 930, memory circuitry 940, power management circuitry 950, non-transitory storage device 960, and a network interface 970 for connection to a network 972. The following discussion provides a brief, general description of the components forming the illustrative computing device 900. Example, non-limiting computing devices 900 may include a desktop computing device, blade server device, workstation, or similar device or system.

In embodiments, the processor cores 918 are capable of executing machine-readable instruction sets 914, reading data and/or instruction sets 914 from one or more storage devices 960 and writing data to the one or more storage devices 960. Those skilled in the relevant art will appreciate that the illustrated embodiments as well as other embodiments may be practiced with other processor-based device configurations, including portable electronic or handheld electronic devices, for instance smartphones, portable computers, wearable computers, consumer electronics, personal computers ("PCs"), network PCs, minicomputers, server blades, mainframe computers, and the like.

The processor cores 918 may include any number of hardwired or configurable circuits, some or all of which may include programmable and/or configurable combinations of electronic components, semiconductor devices, and/or logic elements that are disposed partially or wholly in a PC, server, or other computing system capable of executing processor-readable instructions.

The computing device 900 includes a bus or similar communications link 916 that communicably couples and facilitates the exchange of information and/or data between various system components including the processor cores 918, the cache 962, the graphics processor circuitry 912, one or more wireless I/O interfaces 920, one or more wired I/O interfaces 930, one or more storage devices 960, and/or one or more network interfaces 970. The computing device 900 may be referred to in the singular herein, but this is not intended to limit the embodiments to a single computing device 900, since in certain embodiments, there may be more than one computing device 900 that incorporates, includes, or contains any number of communicably coupled, collocated, or remote networked circuits or devices.

The processor cores 918 may include any number, type, or combination of currently available or future developed devices capable of executing machine-readable instruction sets.

The processor cores 918 may include (or be coupled to) but are not limited to any current or future developed single- or multi-core processor or microprocessor, such as: on or more systems on a chip (SOCs); central processing units (CPUs); digital signal processors (DSPs); graphics processing units (GPUs); application-specific integrated circuits (ASICs), programmable logic units, field programmable gate arrays (FPGAs), and the like. Unless described otherwise, the construction and operation of the various blocks shown in FIG. 8 are of conventional design. Consequently, such blocks need not be described in further detail herein, as they will be understood by those skilled in the relevant art. The bus 916 that interconnects at least some of the components of the computing device 900 may employ any currently available or future developed serial or parallel bus structures or architectures.

The system memory 940 may include read-only memory ("ROM") 642 and random access memory ("RAM") 946. A portion of the ROM 942 may be used to store or otherwise retain a basic input/output system ("BIOS") 944. The BIOS 944 provides basic functionality to the computing device 900, for example by causing the processor cores 918 to load and/or execute one or more machine-readable instruction sets 914. In embodiments, at least some of the one or more machine-readable instruction sets 914 cause at least a portion of the processor cores 918 to provide, create, produce, transition, and/or function as a dedicated, specific, and particular machine, for example a word processing machine, a digital image acquisition machine, a media playing machine, a gaming system, a communications device, a smartphone, or similar.

The computing device 900 may include at least one wireless input/output (I/O) interface 920. The at least one wireless I/O interface 920 may be communicably coupled to one or more physical output devices 922 (tactile devices, video displays, audio output devices, hardcopy output devices, etc.). The at least one wireless I/O interface 920 may communicably couple to one or more physical input devices 924 (pointing devices, touchscreens, keyboards, tactile devices, etc.). The at least one wireless I/O interface 920 may include any currently available or future developed wireless I/O interface. Example wireless I/O interfaces include, but are not limited to: BLUETOOTH®, near field communication (NFC), and similar.

The computing device 900 may include one or more wired input/output (I/O) interfaces 930. The at least one wired I/O interface 930 may be communicably coupled to one or more physical output devices 922 (tactile devices, video displays, audio output devices, hardcopy output devices, etc.). The at least one wired I/O interface 930 may be communicably coupled to one or more physical input devices 924 (pointing devices, touchscreens, keyboards, tactile devices, etc.). The wired I/O interface 930 may include any currently available or future developed I/O interface. Example wired I/O interfaces include, but are not limited to: universal serial bus (USB), IEEE 1394 ("Fire-Wire"), and similar.

The computing device 900 may include one or more communicably coupled, non-transitory, data storage devices 960. The data storage devices 960 may include one or more hard disk drives (HDDs) and/or one or more solid-state storage devices (SSDs). The one or more data storage devices 960 may include any current or future developed storage appliances, network storage devices, and/or systems. Non-limiting examples of such data storage devices 960 may include, but are not limited to, any current or future developed non-transitory storage appliances or devices, such as one or more magnetic storage devices, one or more optical storage devices, one or more electro-resistive storage devices, one or more molecular storage devices, one or more quantum storage devices, or various combinations thereof. In some implementations, the one or more data storage devices 960 may include one or more removable storage devices, such as one or more flash drives, flash memories, flash storage units, or similar appliances or devices capable of communicable coupling to and decoupling from the computing device 900.

The one or more data storage devices 960 may include interfaces or controllers (not shown) communicatively coupling the respective storage device or system to the bus 916. The one or more data storage devices 960 may store, retain, or otherwise contain machine-readable instruction sets, data structures, program modules, data stores, databases, logical structures, and/or other data useful to the processor cores 918 and/or graphics processor circuitry 912 and/or one or more applications executed on or by the processor cores 918 and/or graphics processor circuitry 912. In some instances, one or more data storage devices 960 may be communicably coupled to the processor cores 918, for example via the bus 916 or via one or more wired communications interfaces 930 (e.g., Universal Serial Bus or USB); one or more wireless communications interfaces 920 (e.g., Bluetooth®, Near Field Communication or NFC); and/or one or more network interfaces 970 (IEEE 802.3 or Ethernet, IEEE 802.11, or Wi-Fi®, etc.).

Processor-readable instruction sets 914 and other programs, applications, logic sets, and/or modules may be stored in whole or in part in the system memory 940. Such instruction sets 914 may be transferred, in whole or in part, from the one or more data storage devices 960. The instruction sets 914 may be loaded, stored, or otherwise retained in system memory 940, in whole or in part, during execution by the processor cores 918 and/or graphics processor circuitry 912.

The computing device 900 may include power management circuitry 950 that controls one or more operational aspects of the energy storage device 952. In embodiments, the energy storage device 952 may include one or more primary (i.e., non-rechargeable) or secondary (i.e., rechargeable) batteries or similar energy storage devices. In embodiments, the energy storage device 952 may include one or more supercapacitors or ultracapacitors. In embodiments, the power management circuitry 950 may alter, adjust, or control the flow of energy from an external power source 954 to the energy storage device 952 and/or to the computing device 900. The power source 954 may include, but is not limited to, a solar power system, a commercial electric grid, a portable generator, an external energy storage device, or any combination thereof.

For convenience, the processor cores 918, the graphics processor circuitry 912, the wireless I/O interface 920, the wired I/O interface 930, the storage device 960, and the network interface 970 are illustrated as communicatively coupled to each other via the bus 916, thereby providing connectivity between the above-described components. In alternative embodiments, the above-described components may be communicatively coupled in a different manner than illustrated in FIG. 8. For example, one or more of the above-described components may be directly coupled to other components, or may be coupled to each other, via one or more intermediary components (not shown). In another example, one or more of the above-described components may be integrated into the processor cores 918 and/or the graphics processor circuitry 912. In some embodiments, all or a portion of the bus 916 may be omitted and the components are coupled directly to each other using suitable wired or wireless connections.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

Throughout the document, term "user" may be interchangeably referred to as "viewer", "observer", "speaker", "person", "individual", "end-user", and/or the like. It is to be noted that throughout this document, terms like "graphics domain" may be referenced interchangeably with "graphics processing unit", "graphics processor", or simply "GPU" and similarly, "CPU domain" or "host domain" may be referenced interchangeably with "computer processing unit", "application processor", or simply "CPU".

It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", "software package", and the like, may be used interchangeably throughout this document. Also, terms like "job", "input", "request", "message", and the like, may be used interchangeably throughout this document.

In various implementations, the computing device may be a laptop, a netbook, a notebook, an ultrabook, a smartphone, a tablet, a personal digital assistant (PDA), an ultra-mobile PC, a mobile phone, a desktop computer, a server, a set-top box, an entertainment control unit, a digital camera, a portable music player, or a digital video recorder. The computing device may be fixed, portable, or wearable. In further implementations, the computing device may be any other electronic device that processes data or records data for processing elsewhere.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Embodiments may be provided, for example, as a computer program product which may include one or more transitory or non-transitory machine-readable storage media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Some embodiments pertain to Example 1 that includes an apparatus comprising a processor comprising a trusted execution environment (TEE) to be attested by a plurality of service provider servers on behalf of a plurality of endpoint devices in a network environment and provision kernels for the plurality of service provider servers requesting to access one or more of the plurality of endpoint devices.

Example 2 includes the subject matter of Example 1, wherein the TEE redirects requests from the plurality of service provider servers to the plurality of endpoint devices.

Example 3 includes the subject matter of Examples 1 and 2, wherein the TEE performs registration with the plurality of endpoint devices.

Example 4 includes the subject matter of Examples 1-3, wherein the TEE performing the registration with the plurality of endpoint devices comprises registering with endpoint TEEs within the plurality of endpoint devices.

Example 5 includes the subject matter of Examples 1-4, wherein the TEE performing the registration with the plurality of endpoint devices further comprises recording information associated with the plurality of endpoint devices.

Example 6 includes the subject matter of Examples 1-5, wherein the TEE advertises to the plurality of endpoint devices prior to the registration.

Some embodiments pertain to Example 7 that includes a method comprising provisioning kernels at a trusted execution environment (TEE) for a plurality of service provider servers requesting to access a plurality of endpoint devices in a network environment and the TEE redirecting requests from the plurality of service provider servers to the plurality of endpoint devices.

Example 8 includes the subject matter of Example 7, further comprising the TEE performing registration with the plurality of endpoint devices.

Example 9 includes the subject matter of Examples 7 and 8, wherein the TEE performing the registration with the plurality of endpoint devices comprises registering with endpoint TEEs within the plurality of endpoint devices.

Example 10 includes the subject matter of Examples 7-9, wherein the TEE performing the registration with the plurality of endpoint devices further comprises recording information associated with the plurality of endpoint devices.

Some embodiments pertain to Example 11 at least one computer readable medium having instructions stored thereon, which when executed by one or more processors, cause the processors to provision kernels at a trusted execution environment (TEE) for a plurality of service provider servers requesting to access a plurality of endpoint devices in a network environment and redirect requests from the plurality of service provider servers to the plurality of endpoint devices.

Example 12 includes the subject matter of Example 11, having instructions stored thereon, which when executed by one or more processors, further cause the processors to performing registration with the plurality of endpoint devices.

Example 13 includes the subject matter of Examples 11 and 12, wherein the TEE performing the registration with the plurality of endpoint devices comprises registering with endpoint TEEs within the plurality of endpoint devices.

Example 14 includes the subject matter of Examples 11-13, wherein the TEE performing the registration with the plurality of endpoint devices further comprises recording information associated with the plurality of endpoint devices.

Some embodiments pertain to Example 15 that includes a system comprising a master device including a first processor comprising a TEE to be attested by a plurality of service provider servers on behalf of an endpoint device and provision kernels for the plurality of service provider servers requesting to access the endpoint device.

Example 16 includes the subject matter of Example 15, wherein the TEE redirects requests from the plurality of service provider servers to the endpoint device.

Example 17 includes the subject matter of Examples 15 and 16, wherein the TEE performs registration with the endpoint device.

Example 18 includes the subject matter of Examples 15-17, wherein the TEE performing the registration with the endpoint device further comprises recording information associated with the endpoint device.

Example 19 includes the subject matter of Examples 15-18, wherein during the registration the endpoint device installs an application to facilitate communication with the service provider servers.

Example 20 includes the subject matter of Examples 15-19, wherein the endpoint device stores a kernel associated with a first service provider server in response to requesting a service from the first service provider server.

The embodiments of the examples have been described above with reference to specific embodiments. Persons skilled in the art, however, will understand that various modifications and changes may be made thereto without departing from the broader spirit and scope as set forth in the appended claims. The foregoing description and drawings are, accordingly, to be regarded in an illustrative rather than a restrictive sense.

What is claimed is:

1. An apparatus comprising:
   a hardware processor comprising a master trusted execution environment (TEE) to perform attestation with a plurality of service provider servers on behalf of a plurality of endpoint devices in a network environment, register with an endpoint TEE in each of the plurality of endpoint devices and provision kernels for the plurality of service provider servers requesting to access one or more of the plurality of endpoint devices.

2. The apparatus of claim 1, wherein the master TEE redirects requests from the plurality of service provider servers to the plurality of endpoint devices.

3. The apparatus of claim 1, wherein the master TEE performing the registration with the endpoint TEEs at the plurality of endpoint devices further comprises the master TEE recording information associated with the plurality of endpoint devices.

4. The apparatus of claim 1, wherein the master TEE advertises to the plurality of endpoint devices prior to the registration.

5. The apparatus of claim 4, wherein the master TEE advertisement to the plurality of endpoint devices comprises providing an indication to the plurality of endpoint devices that the master TEE is capable of aggregating attestation with the plurality of service provider servers on behalf of a plurality of endpoint devices.

6. The apparatus of claim 1, wherein the master TEE is independent from each endpoint TEE in each of a plurality of endpoint devices.

7. A method comprising:
   provisioning kernels at a master trusted execution environment (TEE) for a plurality of service provider servers requesting to access a plurality of endpoint devices in a network environment;
   the master TEE registering with an endpoint TEE in each of the plurality of endpoint devices; and
   the master TEE redirecting requests from the plurality of service provider servers to the plurality of endpoint devices.

8. The method of claim 7, further comprising the master TEE provisioning kernels for the plurality of service provider servers requesting to access one or more of the plurality of endpoint devices.

9. The method of claim 7, wherein the master TEE performing the registration with the plurality of endpoint devices further comprises recording information associated with the plurality of endpoint devices.

10. The method of claim 7, wherein the master TEE is independent from each endpoint TEE in each of a plurality of endpoint devices.

11. At least one non-transitory computer readable medium having instructions stored thereon, which when executed by one or more processors, cause the processors to:
    provision kernels at a master trusted execution environment (TEE) for a plurality of service provider servers requesting to access a plurality of endpoint devices in a network environment;
    register the master TEE with an endpoint TEE in each of the plurality of endpoint devices; and
    redirect requests from the plurality of service provider servers to the plurality of endpoint devices.

12. The computer readable medium of claim 11, having instructions stored thereon, which when executed by one or more processors, further cause the processors to provision kernels for the plurality of service provider servers requesting to access one or more of the plurality of endpoint devices.

13. The computer readable medium of claim 11, wherein the master TEE performing the registration with the plurality of endpoint devices further comprises recording information associated with the plurality of endpoint devices.

14. The computer readable medium of claim 11, wherein the master TEE is independent from each endpoint TEE in each of a plurality of endpoint devices.

15. A system comprising:
    a master device including a first processor comprising a master TEE to be attested by a plurality of service provider servers on behalf of a plurality of endpoint devices, register the master TEE with an endpoint TEE in each of a plurality of endpoint devices and provision kernels for the plurality of service provider servers requesting to access the endpoint device.

16. The system of claim 15, wherein the master TEE redirects requests from the plurality of service provider servers to the endpoint device.

17. The system of claim 15, wherein during the registration the endpoint device installs an application to facilitate communication with the service provider servers.

18. The system of claim 17, wherein the endpoint device stores a kernel associated with a first service provider server in response to requesting a service from the first service provider server.

19. The apparatus of claim 15, wherein the master TEE is independent from each endpoint TEE in each of a plurality of endpoint devices.

* * * * *